United States Patent [19]

Peters

[11] 3,733,552

[45] May 15, 1973

[54] SYSTEM FOR THE INTERFERENCE-FREE RADIO TRANSMISSION OF SIGNALS

[75] Inventor: Johannes Peters, Deisenhofen near Munich, Germany

[73] Assignee: Bolkow Gesellschaft mit beschrankter Haftung, Munich, Germany

[22] Filed: Aug. 30, 1962

[21] Appl. No.: 220,953

[30] Foreign Application Priority Data

Sept. 21, 1961 Germany.............................B 64085

[52] U.S. Cl. ......................325/122, 325/33, 325/392

[51] Int. Cl................................................H04k 1/00

[58] Field of Search..........................325/32, 33, 392, 325/122, 183, 34, 30; 179/1.5, 1.5 FS, 1.5 E, 1.5 C; 343/100.7, 100 CL; 178/22

[56] References Cited

UNITED STATES PATENTS

| | | | |
|---|---|---|---|
| 1,606,763 | 11/1926 | Hartley | 179/1.5 |
| 2,530,140 | 11/1950 | Atkins | 325/33 |
| 2,897,351 | 7/1959 | Melton | 343/100.7 |

*Primary Examiner*—Richard A. Farley
*Attorney*—McGlew & Toren

EXEMPLARY CLAIM

6. In a system for the radio transmission of control signals to a self-propelled body having control planes in combination a noise generator for producing a broad noise band, and a first frequency selector for suppressing in that band at least one unique band and a second frequency selector for replacing said at least one unique band by another band of an identical noise power frequency response being correlated by frequency conversion relative to a reference band in that broad noise band and a transmitting stage for transmitting to the body to be guided the frequency band combined of frequency bands which had been suppressed and replaced by correlation bands which first frequency selector is connected with a frequency converter and with control stages being coordinated with one control plane each, which converter is fed from an oscillator for producing the correlated frequency bands, which converter is further connected directly and through a phase-reverter stage each with the above-mentioned control stages for each frequency band, which control stages are connected with the above-mentioned second frequency selector for feeding the suppressed band or correlated frequency bands to said frequency selector, said stages forming the transmitter base, and a receiving station on the self-propelled body comprising an input stage and a frequency selector, which is connected for each control plane with one converter, each being coordinated to one frequency band, shifting the information carrying band into the frequency range of the reference band and a correlator for each control plane band, and which correlators are fed from the output of the above-mentioned converters and from the reference band which correlators determine the control signals for each control plane from the frequency bands supplied by the above-mentioned frequency selector and from the reference frequency bands, said control signals being given at the control center.

7 Claims, 14 Drawing Figures

Figure 1:
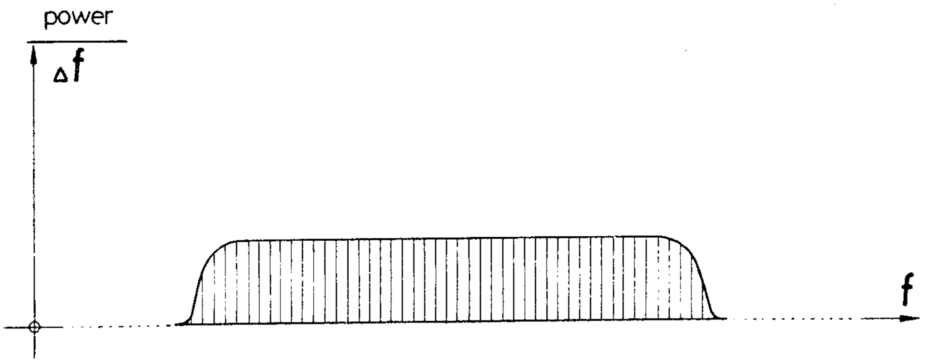

Inventor:
Johannes Peters

Attorneys:
Watson, Cole, Grindle & Watson

Jnventor:
Johannes Peters

ATTORNEYS:
Watson, Cole, Grindle & Watson

Jnventor:
Johannes Peters
ATTORNEYS:
Watson, Cole, Grindle & Watson

Jnventor:
Johannes Peters

ATTORNEYS:
Watson, Cole, Grindle & Watson

Inventor:
Johannes Peters
ATTORNEYS.
Watson, Cole, Grindle & Watson

Jnventor:
Johannes Peters
ATTORNEYS:
Watson, Cole, Grindle & Watson

Jnventor:
Johannes Peters

ATTORNEYS:
Watson, Cole, Grindle & Watson

Jnventor:
Johannes Peters
ATTORNEYS:
Watson, Cole, Grindle & Watson

SYSTEM FOR THE INTERFERENCE-FREE RADIO TRANSMISSION OF SIGNALS

The invention relates to a method and apparatus for radio transmission of signals, in particular guidance signals to self-propelled bodies.

Said signals are produced by a control center in conformity with the observed deviation of said body from the path to its target and are usually coded before their radio transmission to the body to be guided, in order to render it difficult for a potential enemy to evaluate or jam the transmitted guidance signals.

To render it difficult for an enemy to listen to, to detect and to evaluate signals, it is moreover known that well focusing directional antennas are used at the transmitter base as well as at the receiving station, the transmission power is chosen as high as possible, while the sensitivity of the receiver is kept as low as possible, and all dispensable messages, which might facilitate the enemy's evaluation work, are suppressed in the signal to be transmitted.

Experience has shown, however, that all these measures are not sufficient to prevent electronic countermeasures by the enemy. After evaluating received signals the enemy cannot only transmit false, i.e., apparently authentic, signals, but he can also considerably suppress the reception of signals or even prevent it completely by suppressing any receiver-input by interference energy, said previous evaluation being thus dispensable.

For interrupting or at least considerably disturbing the transmission of information by means of jamming stations, it will be sufficient for the enemy to find out the frequency band used for the transmission of the signals.

The information which can be transmitted through a jammed channel is theoretically limited; and any improvement of said limit on the receiving station by technical measures is impossible. If S denotes the signal power flowing from a transmitter base to the receiving antenna, W denotes the band width of the signal power, and N denotes that jamming noise power which the receiver receives from the jamming station within the same frequency band, the information rate in bit/sec is:

$$H = W\, ld\, [1 + (S/N)]$$

where *ld* is the logarithm with respect to base 2 (logarithmus dualis).

If the useful energy received by the receiver is not constant within the band, W can be decomposed in individual adjacent bands $W_1$, $W_2$ etc. of equal width Δ W, and hence we obtain $$H_{max} = \Delta W \sum_{\nu=1}^{n} 1d\left(1 + \frac{S_\nu}{N_\nu}\right)$$

where $S_\nu$ and $N_\nu$ are the respective signal and noise powers within the corresponding band $W_\nu$.

Therefrom will result the following conclusions:

1. An enemy, who wants to achieve a maximum jamming effect with a given total energy $$N = \sum N_\nu$$

suitably distributes his energy just in the same way as the useful transmitter so that the signal/noise ratio $S_\nu$ $N_\nu$ becomes approximately independent of $\nu$.

If he leaves any gap, the possible contribution of this partial band to the total information rate will become very large.

2. Even in the case of optimum jamming by the enemy, the total energies being limited on both sides, the information rate increases proportionally to the band width *W*. In respect of these relations it will be decisive
   1. to give the enemy as little lead as possible on the transmitted frequency distribution of the useful energy,
   2. to use as wide frequency bands as possible for the transmission,
   3. to use a transmission method the code security of which approaches the theoretical limit as much as possible.

It is of course known that the average information *H* can be increased by a large band width *W*. While the band width *W* is kept as small as possible for commercial wireless signal communications in order to avoid mutual interference, the band width *W* is chosen as large as possible in the case of military communications for the reasons mentioned above with the restriction, however, that the chosen band width can be fully used due to correspondingly coding the signals to be transmitted.

The known measures, however, do not allow to code a signal to be transmitted in such a way that all characteristic features will disappear in said signal, e.g., fixed frequencies or periodic pulse repetitions, which give the enemy sufficient leads for an electronic evaluation and for the resulting jamming.

This is the point where the invention enters into play. It is the object of the invention to use the known correlation procedure for coding signals to be transmitted in such a way that the transmitted signal or the transmitted signal repetition does not give the enemy any lead on the existence of a signal transmission. For this purpose use is being made of the fact that, when two signals $F_1$ (t) and $F_2$ (t) are transmitted, the information can be contained in the correlation function $$\phi_{12}(\tau) = \frac{1}{T}\int_0^T F_1(t) F_2(t-\tau)\, dt$$

Strictly speaking there holds the limiting value for $T \to \infty$. In the present case, however, let *T* be a finite time resulting from the time constant of the technical equipment. Correspondingly, the correlation functions shall not denote the mathematical limiting case in the following, but they shall denote their approximations which can be technically achieved.

When the two output signals $F_1(t)$ and $F_2(t)$ are not correlated with each other, $\phi_{12}(\tau)$ will become zero for a sufficiently long interval $\tau$ and will assume a positive or negative mean value in the case of correlation, said average value depending on the displacement $\tau$. If we choose $\tau = 0$, this average value will be given by $$\phi_{12}(0) = \frac{1}{T}\int_0^T F_1(t) F_2(t)\, dt$$

which can be technically achieved without difficulty by multiplying the two functions with each other and by subsequent integration.

It is the object of this invention to use this average value as a signal element of the control signal as a whole.

A further object of this invention is to produce a noise of an extraordinarily broad band width at the transmitter base having approximately a constant power density per frequency interval. Within this very broad noise band at least two, not overlapping bands are selected. Each of these bands should have a frequency response in the decay region being symmetrically arranged to the center frequency. Correlation between the noise signals in these two channels will indicate a "one" signal element whereas no correlation will transfer the signal element "zero." Since one of these two bands is to be considered as a reference signal, the number of required bands is always by one greater than the number of independent signal channels. Without any additional manipulation the noise in partial and not overlapping bands of the same noise generator is uncorrelated, giving the signal element "zero" in each signal channel. To produce correlation, the original noise in a signal channel is to be suppressed and to be replaced by a noise band of identical constant density of power output for the frequency interval. This noise is derived from the reference noise by frequency-conversion. The noise now radiated from the transmitter does not change the frequency response of the power nor any other conspicuous character.

At the receiver output cross-correlation between the reference noise and the noise in one of the signal channels will produce the signal element "one," if correlation was forced upon the signal channel with reference to the reference channel. In any other case, the signal element "zero" will be produced. It is therefore moreover the object of this invention in a special modification to transmit and to reproduce the sign of the signal.

It is an essential advantage of the method according to the invention that the occurrence of a noise spectrum in a receiving set is usually not surprising (cf. the book "Noise" by A.v.d. Ziel, New York 1954, published by Prentice Hall). The signal transmission according to the invention is at first indistinguishable from thermal noise and can therefore be easily mistaken for the basic noise always existing. Moreover, noise sources result to a vast extent from the cosmic energy radiation. If an enemy actually finds out that the received noise is the carrier of a signal communication, this noise will not give him any leads for any possible evaluation unless auto-correlation analysis is applied to the whole noise band. The time required for such an analysis will assume values beyond practical use, if the band is large enough and if there is no additional information contained in the signal, which is the object of the invention.

In consideration of the above statements and on the assumption that $F_1(t)$ and $F_2(t)$ are random processes it is moreover impossible to disturb such a transmission process over the whole frequency band used by an uniform noise produced by an enemy. He can never make the expression $ld\,[1+(S/N)]$ disappear by the total energy $N$ at his disposal. If the band width $W$ is chosen sufficiently high, $H$ will nevertheless be sufficient for a safe signal communication. If, for instance, the interference $G_1(t)$ is superimposed to the useful output signal $F_1(t)$ and the interference $G_2(t)$ is superimposed to the useful output signal $F_2(t)$, the receiver of a guided missile will produce signals according to the mathematical expressions $$\psi_{12}(o)=\frac{1}{T}\int_o^T (F_1(t)+G_1(t))\cdot(F_2(t)+G_2(t))\,dt$$
$$=\phi_{12}(o)$$
$$+\frac{1}{T}\int_o^T F_1(t)G_2(t)\,dt$$
$$+\frac{1}{T}\int_o^T F_2(t)G_1(t)\,dt$$
$$+\frac{1}{T}\int_o^T G_1(t)G_2(t)\,dt$$

One of the last three terms will not disappear in the limiting case, i.e., the signal transmission will not be disturbed unless an enemy succeeds in getting with his jamming signal onto one of the two signals which is correlated with the other useful signal, or when an enemy succeeds in superimposing disturbances onto both signals which are correlated with each other. Due to the technically existing finite $T$, however, the three last terms deliver noise contributions which decrease with growing $T$ and which disappear in the limiting case. These noise contributions are increased for finite $T$ by the jamming of the enemy. In this case, too, an increase of the band width $W$ is favorable, since, referred to the band width $W_o$, the condition for the interval of integration $T$ is $$2\,W_o\,T >> 1$$

where $W_o$ is the band width of the transmission channel. This means in practice that the signal communication according to the invention can be jammed only when an enemy has sufficient technical knowledge of the signal communication to be jammed.

Simple superposition of interference energy on the transmitted band width, i.e., the total suppression of the receiver input sensitivity, is ineffective.

Moreover, the method according to the invention offers the possibility of changing and/or interchanging essential parameters on the transmitter base as well as on the receiving station. It is for instance possible to emit hidden or open false signals from the transmitter base for the purposes of screening or misleading without any effect being produced by these signals on the receiver station of the body to be guided which is due to the correlation method applied.

The details of the invention will be best understood from the following description in connection with the accompanying drawing in which two exemples of embodiment of the invention are shown more or less schematically.

Figure 2:
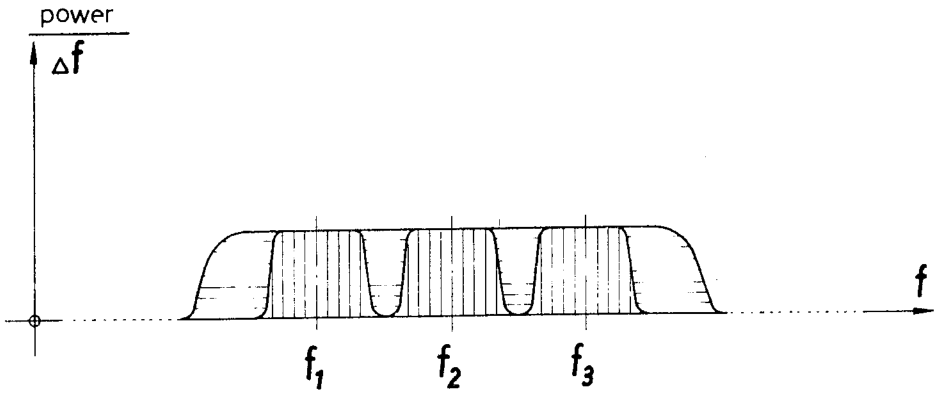
Figure 3:
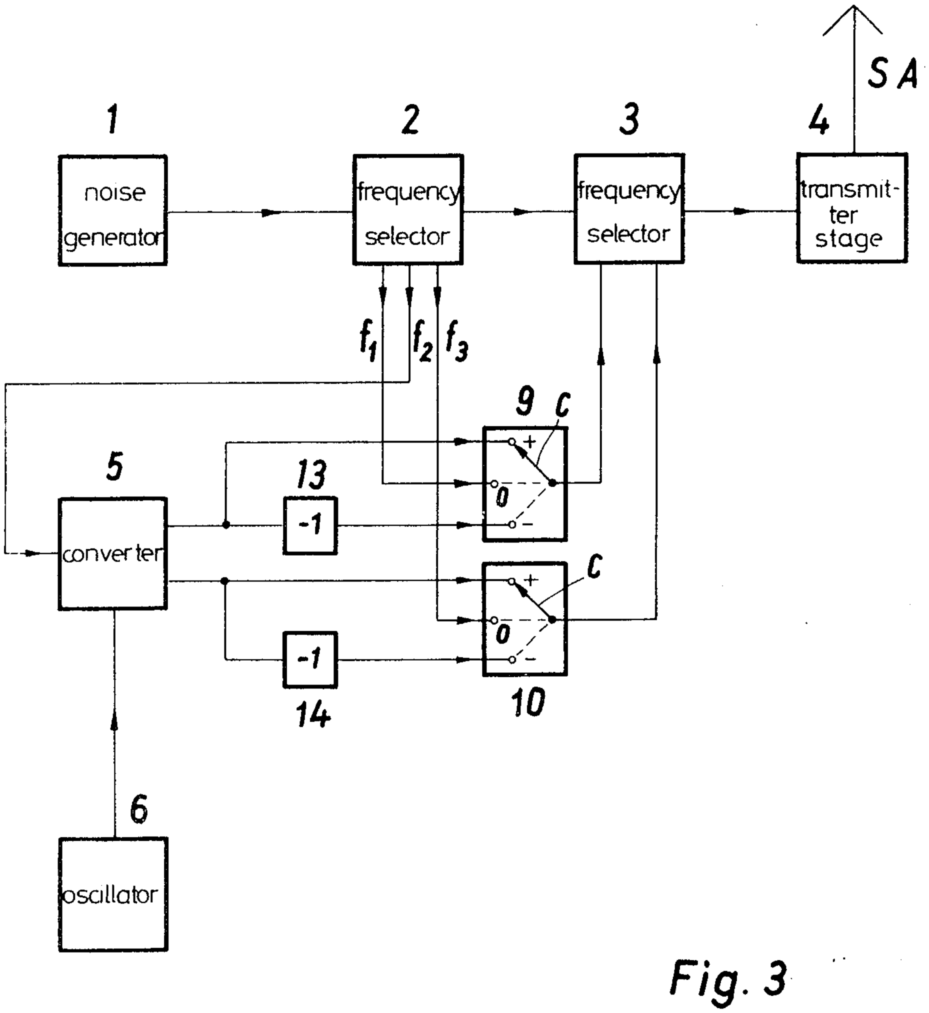
Figure 4:
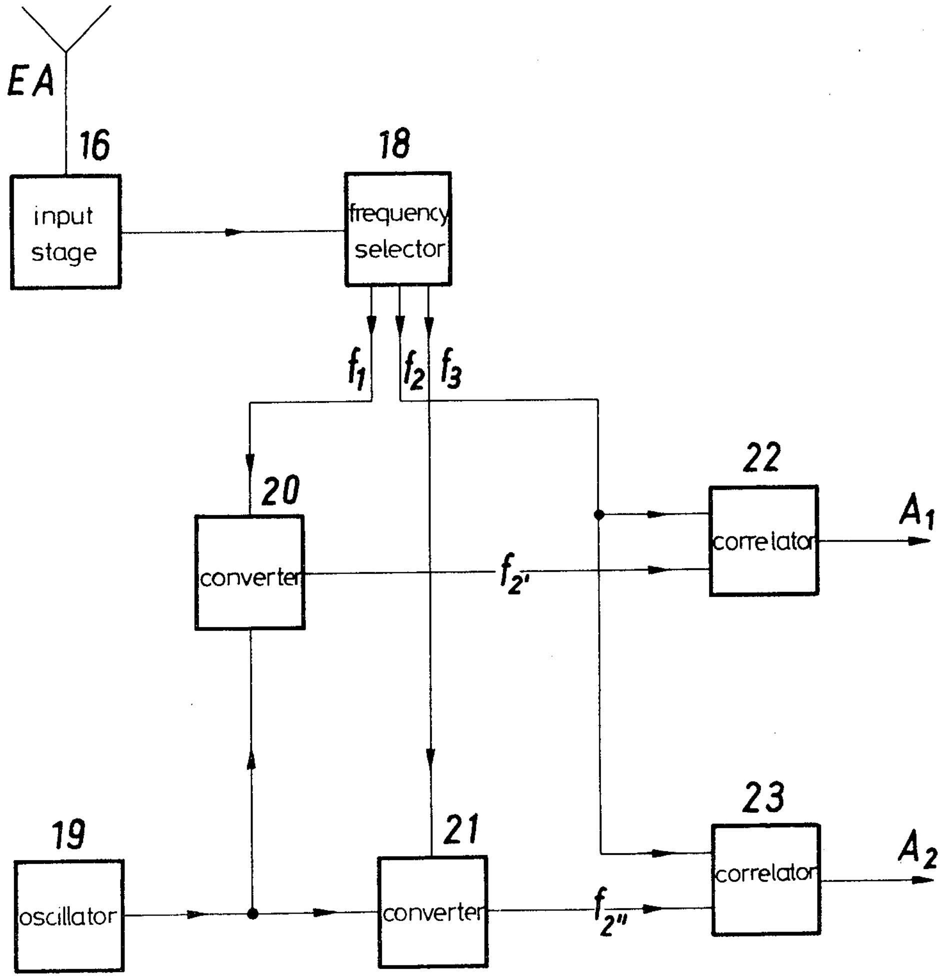
Figure 7:
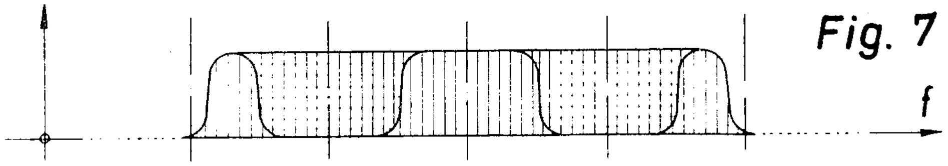
Figure 8:
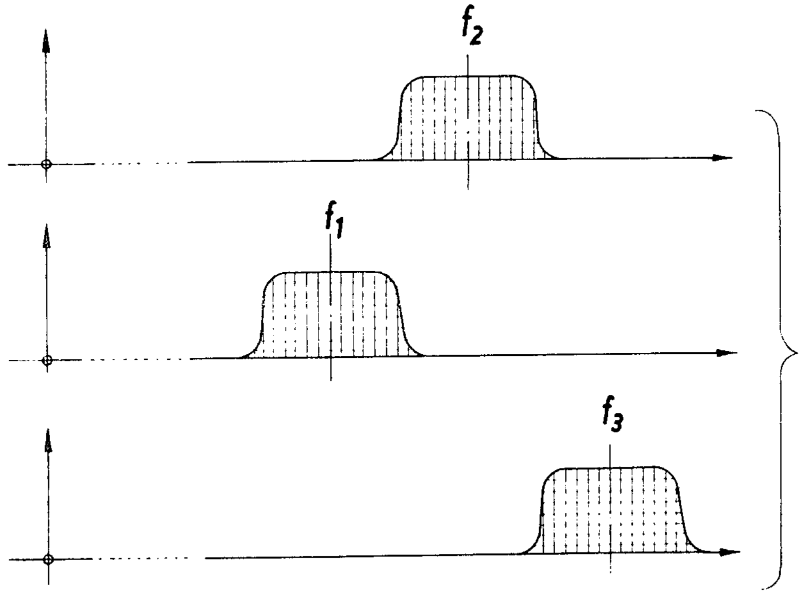
Figure 9:
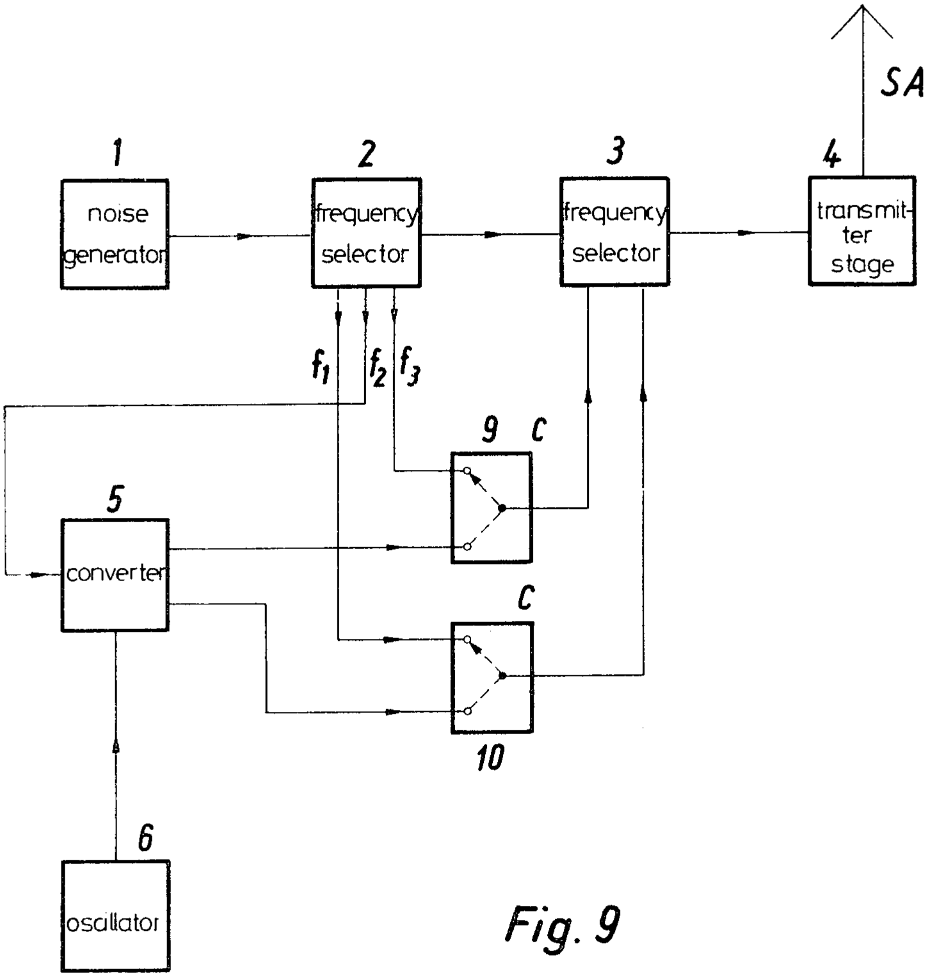
Figure 10:
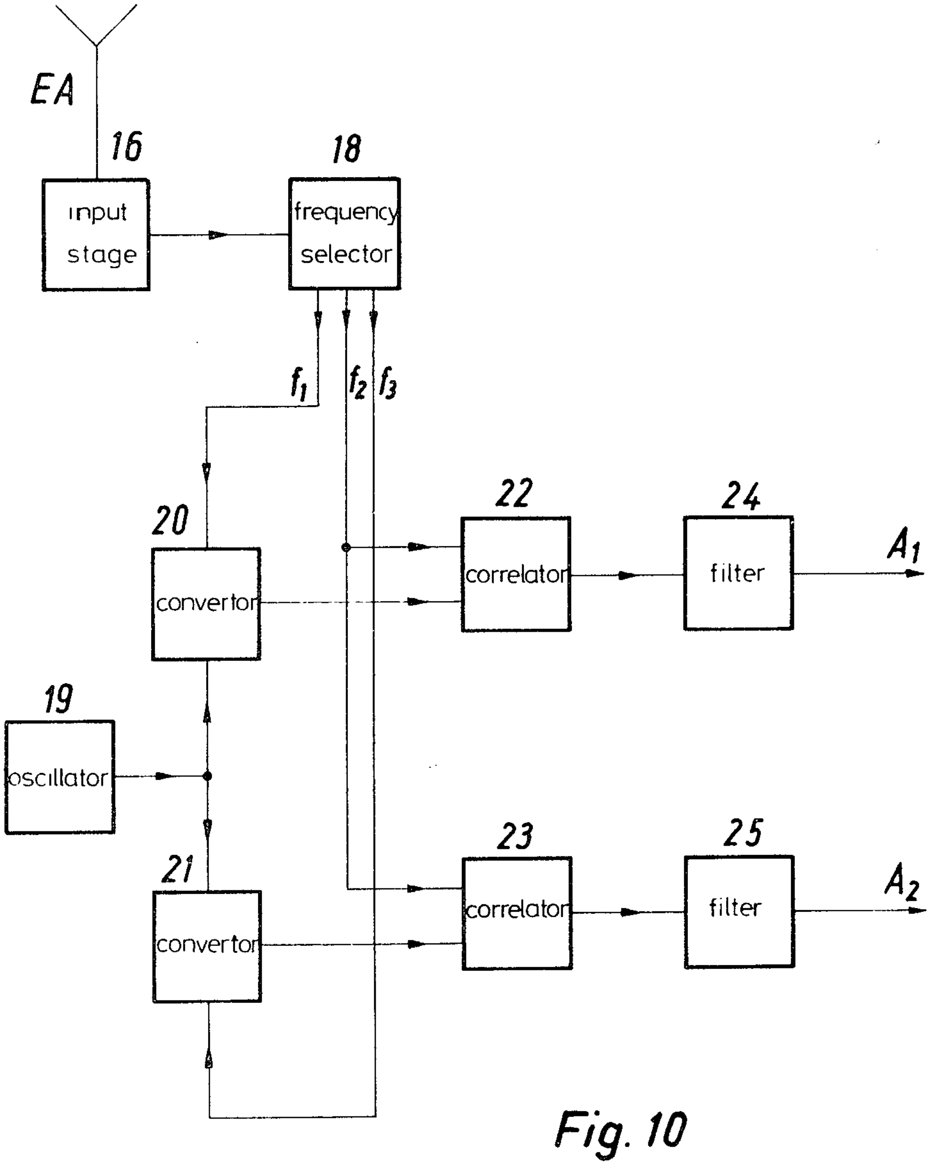
Figure 11:
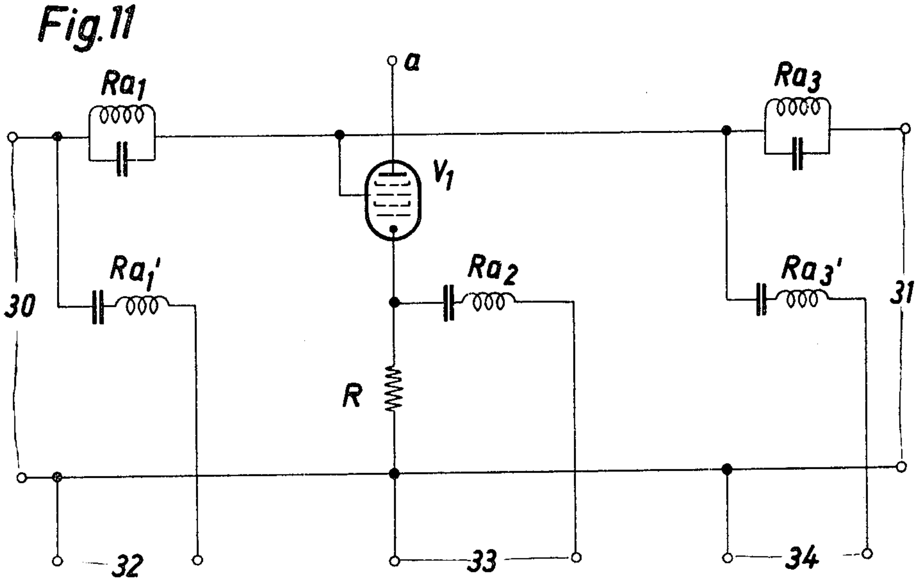
Figure 12:
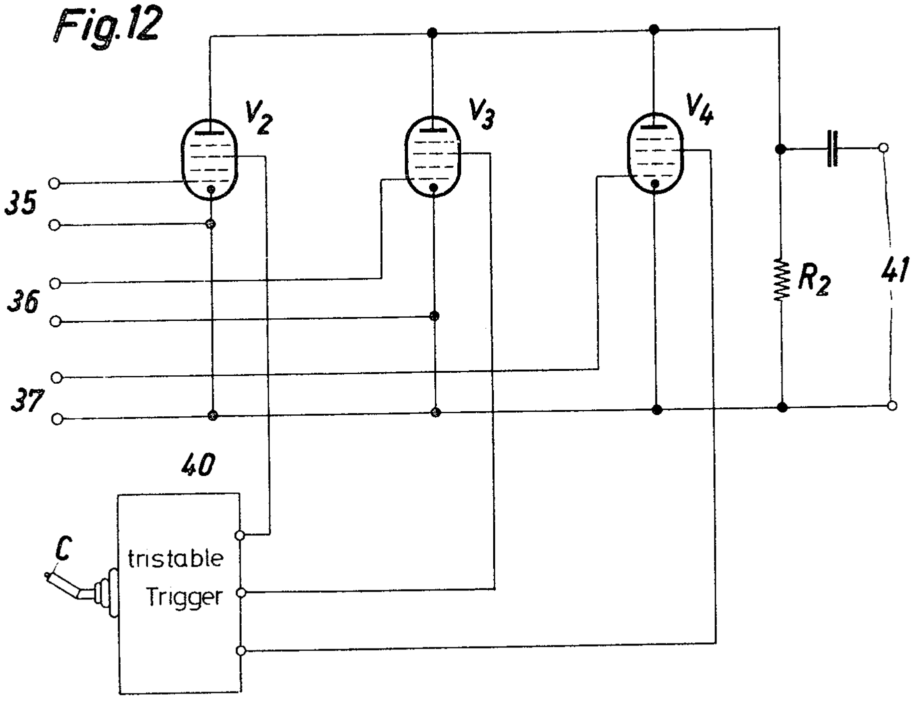
Figure 13:
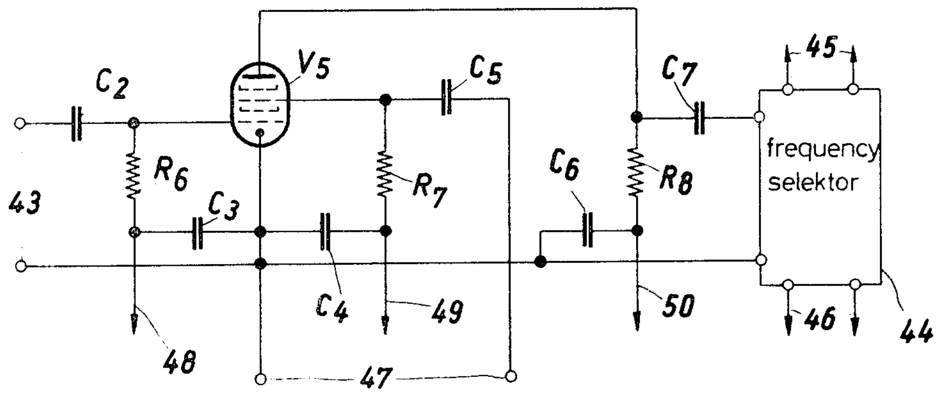
Figure 14:
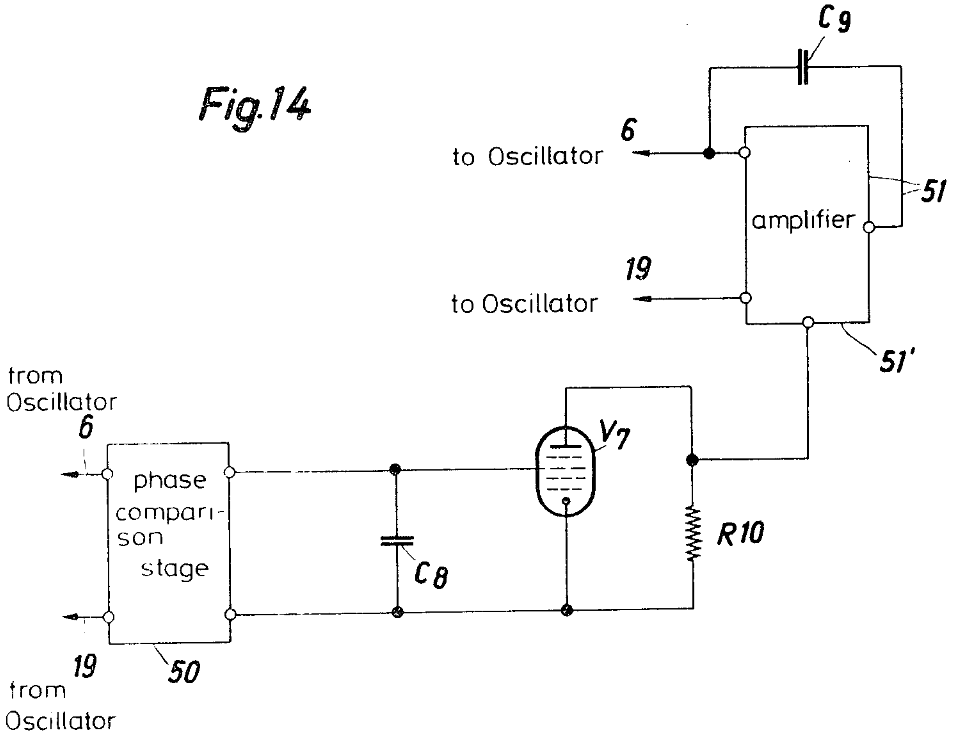

FIG. 1 is a frequency diagram of a white noise,

FIG. 2 is a frequency diagram with frequency bands chosen for the correlation, FIG. 3 is a block diagram of a transmitter base for the application of a method in accordance with the present invention, FIG. 4 is a block diagram of a receiving station, FIGS. 5 to 8 are the frequency diagrams coordinated to a transmitter base according to FIG. 3, FIG. 9 is a block diagram of a modification of the transmitter base, FIG. 10 is a block diagram of a modification of the receiving station, FIG. 11 is a simplified circuit diagram of an exemplified embodiment of a frequency selector according to FIG. 3, FIG. 12 is a simplified circuit diagram of a control stage according FIG. 3, FIG. 13 is a simplified circuit diagram of a converter stage according FIG. 3, FIG. 14 is a simplified circuit diagram of a synchronizing stage.

In order to facilitate the understanding of the two exemplified embodiments of the invention, the mode of operation of the method according to the invention will first be explained by means of FIGS. 1 and 2.

A control transmitter which is still to be described and which is only schematically shown in FIG. 3 radiates a broad-band noise without carrier and without synchronizing pulses, said noise having an approximately constant power density per frequency interval which is shown in FIG. 1. Within this interval several bands, which correspond to the number of signals required, are determined for carrying the information. Said bands are preferably arranged symmetrically to the three arbitrarily chosen center frequencies of the bands $f_1, f_2, f_3$; cf. FIG. 2.

The energy, which is actually radiated by the transmitter shall have the same frequency distribution independent of the correlation, so that the above subdivision of the whole band cannot be recognized, since the gaps between the chosen bands and the decay regions in the energy spectrum adjacent to the boundaries are filled up in such a way that the energy distribution does not differ from the frequency diagram according to FIG. 1.

The correlation can be produced most simply by frequency conversion. This frequency conversion is especially simple when the common reference noise lies near $f_2$ and when $f_2-f_1=f_3-f_2=f_0$ so that a converter which is designed as a modulator will be sufficient in the signal transmitter for producing the two correlated side bands.

The circuit diagram needed for the application of the method and comprising a signal transmitter and a receiver shall now be described in connection with FIGS. 3 to 8.

The signal transmitter mainly consists of a noise generator 1 of conventional design (FIG. 3), two frequency selectors 2 and 3, one transmitter stage 4, a converter stage 5, and an oscillator 6 belonging to the converter stage. An energy spectrum reaching from $f_a$ to $f_b$ is produced by noise generator 1. Said energy spectrum is shown in FIG. 2. It contains three arbitrarily chosen center frequencies $f_1$, $f_2$, and $f_3$. Let for instance be assumed a frequency of 10 megacycles per second for $f_a$, a frequency of 15 megacycles per second for $f_1$, a frequency of 20 megacycles per second for $f_3$, and a frequency of 25 megacycles per second for $f_b$. These mean frequencies lie within frequency bands of frequency widths of for instance 4 megacycles per second. As shown in FIG. 3 this energy spectrum, which is produced by the noise generator, is supplied to frequency selector 2, which suppresses the frequency bands around $f_1$ and $f_3$, so that frequency selector 3 receives a frequency spectrum from frequency selector 2 which is shown in FIG. 6.

The frequency selectors can be constructed as reactance circuits , i.e., they consist of nearly loss-free inductances and capacities. FIG. 11 shows an exemplified embodiment of such a selector. It consists of reactance members $Ra_1$, $Ra_1'$ , $Ra_2$, $Ra_3$, $Ra_3'$ and of an amplifying valve $V_1$, to which are supplied the anode voltage at $a$ and the cathode return through resistor R. Input 30 leads to noise generator 1, while output 31 leads to frequency selector 3, cf. FIG. 3. The frequencies $f_1, f_2$, and $f_3$ can be received through outputs 32, 33 and 34.

The frequency-bands around $f_1$ and $f_3$ which are suppressed by means of frequency selector 2 are supplied to control stages 9 and 10, respectively, one of the control stages being coordinated to the one control plane of the missile to be guided and the other signal transmitter being coordinated to the other control plane standing at a right angle to the former. Each control stage has a control member C which can occupy a neutral position "zero" as well as + and − positions, respectively. When the control members just described are in their zero-position, the frequency bands suppressed through frequency selector 2 can again be supplied to frequency selector 3 through control stages 9 and 10. The gaps shown in the frequency spectrum of FIG. 6 are thus filled again so that we obtain a spectrum identical to that of FIG. 5. This state is coordinated to a zero-command each in both control planes. In order to produce a positive or a negative control signal, the frequency band around $f_2$ is repeated from frequency selector 2 without dissipation from the output and is supplied to converter 5. The frequency band is here modulated with a carrier $\sin\pi (f_2-f_1) t$, which is taken from oscillator 6. This modulation produces two side bands also fitting well into the gaps around $f_1$ and $f_3$ of the spectrum shown in FIG. 6.

Figure 5:
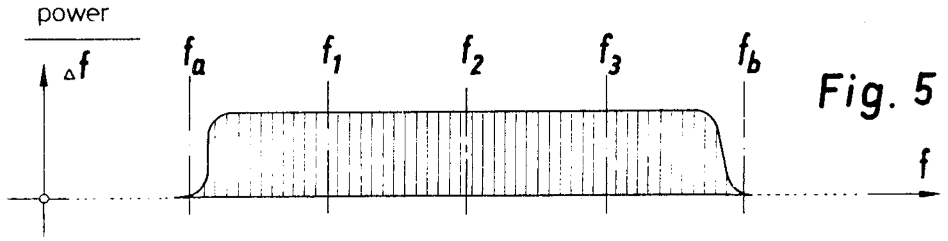
Figure 6:
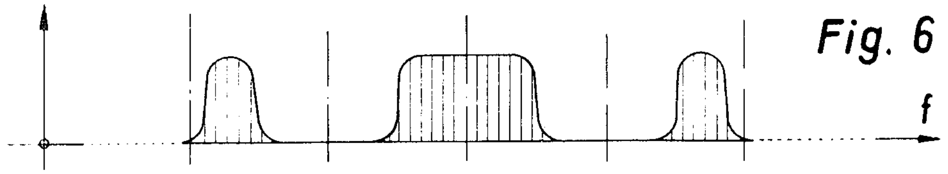

The positions of the three frequency bands with reference to FIGS. 5 to 7 occurring at the input and at the output of modulator 5 are shown in FIG. 8. The modulated frequency bands $f_1$ and $f_3$ are supplied to control stages 9 and 10 from modulator 5 which is done once directly and once through a phase-conversion stage 13 (FIG. 3) and 14, respectively. Each signal transmitter will thus receive a modulated frequency band $f_1$ and $f_3$, respectively, with positive sign and a modulated frequency band $f_1$ and $f_3$, respectively, with negative sign.

Now three spectra each are available at the input of control-stage 9 and 10, said spectra having the same energy distribution over the frequency and just filling the gaps of the spectrum shown in FIG. 6.

Independent of the positions of the control members C of control stage 9 and 10 transmitting stage 4 will therefore always receive an energy spectrum of equal energy density shown in FIG. 5, said energy spectrum corresponding to that of FIG. 5. Depending on the positive or negative position and on the zero-position, respectively, of the control members C of control stage 9 and 10, however, said energy spectrum contains frequency bands $f_1$ and $f_3$, respectively, correlated with the frequency band around $f_2$ or it contains non-correlated frequency bands $f_1, f_2$, and $f_3$. Thus a positive or a negative control signal in the two control planes available or a zero-signal can be transmitted to the body to be guided through antenna SA.

An exemplified embodiment of a control stage is shown schematically in FIG. 12. Two amplifying valves $V_2$ and $V_3$ each transmit the one or the other polarity of the band around $f_1$ and around $f_3$, respectively.

On the output side the valves are connected in parallel through a common anode feed resistor $R_2$ and work alternately only. At this a positive or a negative control signal is transmitted. Another valve $V_4$ serves for transmitting a control signal represented by the original, i.e., the non-correlated noise around $f_1$ and $f_3$. Inputs 35 and 36 lead to modulator 5 in the way shown in FIG. 3, while input 37 is fed from frequency selector 2.

The valves $T_2$ to $T_4$ may have a second control grid each, which are connected to a tristable trigger 40, the switch positions of which can be controlled for instance by a hand-operated control stick C. Output 41 leads to frequency selector 3, cf. FIG. 3. FIG. 13 shows an exemplified embodiment of a converter denoted by 5 in FIG. 3, said converter having to produce frequency bands $f_1$ and $f_3$ by a frequency conversion of band $f_2$, which was already mentioned. Said converter is a broad-band amplitude modulator consisting of a valve $V_5$, resistors $R_6$, $R_7$, $R_8$, and coupling condensers $C_2$ to $C_7$. Input 43 of the modulator leads to frequency selector 2 in FIG. 3, while the output is led through frequency selector 44 which serves to suppress the original band $f_2$ and the frequency $f_o$ of oscillator 6. Outputs 45 and 46 of the selector lead to control stages 9 and 10 of FIG. 3. The oscillator frequency $f_o$ is supplied to the modulator through input 47. Lines 48, 49 and 50 serve to supply the required grid voltages and the anode voltage, respectively.

FIG. 4 shows the receiver fitted in the body to be guided. The noise received through antenna EA is supplied to frequency selector 18 through input stage 16. The frequency bands around $f_1$, $f_2$, and $f_3$ are taken from the frequency spectrum by means of the frequency selector, cf. FIG. 8. The frequency band around $f_1$ is supplied to converter 20, while the frequency band around $f_3$ is supplied to converter 21, both converters being each coordinated to one of the control planes standing at right angles to each another.

Moreover, the receiver has an oscillator 19 producing the same frequency in locked phase relation as the oscillator 6 in the signal transmitter, cf. FIG. 3. The abovementioned frequency is also supplied to the two converters 20 and 21, of which converter 20 displaces the frequency band around $f_1$ upwards and converter 21 displaces the frequency band around $f_3$ downwards so that both frequency bands correspond to the frequency band around $f_2$ in the energy spectrum. In FIG. 4 said displaced frequency around $f_1$ is denoted by $f_{2'}$, said displaced frequency around $f_2$ is denoted by $f_{2''}$.

Finally, a correlator 22 and 23, respectively, is provided for each control plane, said correlators receiving the frequency band around $f_2$ through frequency selector 18 and the frequency bands around $f_1$ and $f_3$, respectively, through converters 20 and 21, respectively. If correlator 22 detects a correlation between frequency bands $f_1$ and $f_2$, a positive or a negative control signal will be given to output $A_1$ depending on the sign. The same occurs in correlator 23 which, in the case of a correlation between the bands $f_2$ and $f_3$, switches a control signal onto its output $A_2$, said control signal depending on the sign. In the present case the correlators are especially simple, because $\tau$ needs not be changed but is always "zero." They consist of simple multiplicators with a following low-pass filter with an extremely small band width of ½ *T*. The control signals determined in this way are further treated in a known way which is not shown here. Frequency selector 18, converters 20 and 21 are similar to these shown in FIGS. 11 and 13, respectively, with the exception, that these circuits have to be adapted to said purposes.

It is the special characteristic of this method that the oscillator of the transmitter has to be repeated in locked phase relation in the receiver. In general, this is technically impossible, unless a carrier wave is transmitted in any way, which, however, would be contradictory to the idea of the invention. When applying the inventive idea to guided missiles, it is possible, however, to synchronize the oscillator 19 of the receiver from the oscillator 6 of the transmitter before launching. Being close to one another, these two oscillators can be easily coupled with one another. The synchronization of the oscillators 6 and 19 is achieved by connecting in parallel the frequency-determinant quartzes of the two oscillators. After launching the missile, i.e., after separating said oscillators, each oscillator will continue running at its own frequency.

The circuit diagramm of the stage shown in FIG. 14 serves to synchronize the two oscillators. The oscillations of oscillators 6 and 19 are transmitted to a phase-comparison stage 50 which produces a control voltage from the difference of the phase positions of the two oscillations, said control voltage being supplied to a condenser C8. The charging voltage of said condenser determines the current of valve $V_7$ which produces a voltage drop at the anode feed resistor $R_{10}$, said voltage drop serving to control the amplification factor of amplifier 51. Amplifier 51 is inversely fed-back through condenser $C_9$ and thus has a controllable input impedance, which is used for the frequency balance of the oscillator to be finely tuned. Since the flying time of the missile to be guided is of the order of magnitude of seconds, the phase difference between the oscillations of the two oscillators can be kept sufficiently small as compared to $\pi$ during the flight, which is done in the way described above. If the control surfaces of the missile are constructed in a known way so that they need one control signal with two different values only, i.e. "plus" and "minus," per control plane instead of a control signal with three different values, viz. "plus," "zero," "minus," in order to perform the control movements, the synchronization in locked phase relation of the oscillators can be dispensed with. For this purpose the two oscillators have to be operated in such a way that they show a frequency difference $\Delta f$ between one another. In the case of signal transmission, i.e., of correlation, the receiver will then supply an alternating voltage of the frequency $\Delta f$ at the correlator output instead of a direct-current voltage. It is suitable to choose a defined frequency spacing $\Delta f$ between the two oscillators so that any disturbances can be removed from the useful signal by means of a filter which is tuned to this frequency. Moreover, this frequency difference increases the insusceptibility to jamming of the signal communication.

FIG. 9 shows a transmitter suitable for the application of this simplified method. All the circuit diagrams which correspond to FIG. 3 have the same reference numerals in FIG. 9. The only difference of this embodiment as compared to that of FIG. 3 consists in that the phase-reverter members 13 and 14 are lacking and that the control members C in the control stages 9 and 10 can therefore occupy two positions only, viz. "plus" and "minus," instead of hitherto three.

FIG. 10 shows the appertaining receiver. In this case, too, the same circuit diagrams as in FIG. 4 have the same reference numerals. The difference of this embodiment as compared to that of FIG. 4 consists in that the filters 24 and 25 which are tuned to the difference frequency $\Delta f$ of the two oscillators 6 and 19 replace the low-pass filters hitherto contained in correlators 22 and 23. For better understanding they are shown in detail in FIG. 10 though they can also be considered as component parts of the correlators 22 and 23 which are especially dimensioned for this special case.

What I claim is:

1. A method for the radio transmission of signals from a control center to a self-propelled body comprising the steps of generating at the transmitter base a broad-band noise of approximately constant power density over the band, from which noise at least two frequency bands are selected, at least one of the frequency-bands being suppressed for producing an information carrying signal and being replaced by a frequency band of equal power distribution in which the signal is correlated to that in the other frequency band in such a way that the noise to be transmitted to the receiving station has an approximately constant power density per frequency interval and from which noise at least the said two frequency bands are selected at the receiving station where the information carrying band and the reference band are then compared in a correlator in such a way that a control signal is produced in the case of correlation between the two frequency bands selected from the noise received.

2. Method according to claim 1, characterized in that for any additional information carrying signal another frequency band has to be suppressed in the broad-band noise density per frequency interval and has to be replaced by a frequency band of approximately constant power being correlated to one of the other frequency bands in such a way that the noise to be transmitted to the receiving station also has an approximately constant power density per frequency interval.

3. Method according to claim 1, characterized in that oscillator frequencies are produced to achieve a frequency-shift in opposite directions between the said noise bands at the transmitter base as well as at the receiving station, the oscillator frequencies being rigid in frequency and rigid in phase compared to one another.

4. Method according to claim 1, characterized in that oscillator frequencies are produced at the transmitter base as well as at the receiving station for achieving a frequency correlation, said frequencies having a frequency difference $\Delta f$ between one another.

5. The method defined by claim 1, wherein said at least two frequency bands are arranged symmetrically to arbitrarily chosen center frequencies.

6. In a system for the radio transmission of control signals to a self-propelled body having control planes in combination a noise generator for producing a broad noise band, and a first frequency selector for suppressing in that band at least one unique band and a second frequency selector for replacing said at least one unique band by another band of an identical noise power frequency response being correlated by frequency conversion relative to a reference band in that broad noise band and a transmitting stage for transmitting to the body to be guided the frequency band combined of frequency bands which had been suppressed and replaced by correlation bands which first frequency selector is connected with a frequency converter and with control stages being coordinated with one control plane each, which converter is fed from an oscillator for producing the correlated frequency bands, which converter is further connected directly and through a phase-reverter stage each with the above-mentioned control stages for each frequency band, which control stages are connected with the above-mentioned second frequency selector for feeding the suppressed band or correlated frequency bands to said frequency selector, said stages forming the transmitter base, and a receiving station on the self-propelled body comprising an input stage and a frequency selector, which is connected for each control plane with one converter, each being coordinated to one frequency band, shifting the information carrying band into the frequency range of the reference band and a correlator for each control plane band, and which correlators are fed from the output of the above-mentioned converters and from the reference band which correlators determine the control signals for each control plane from the frequency bands supplied by the above-mentioned frequency selector and from the reference frequency bands, said control signals being given at the control center.

7. In a system for the radio transmission of control signals to a self-propelled body having at least one control plane in combination a noise generator for producing a broad noise band and a first frequency selector for suppressing the frequency bands provided for carrying information in said noise band, and a second frequency selector for replacing the suppressed bands by frequency bands correlated in frequency to a section in the broad-band noise and a transmitter stage for transmitting the frequency band combined from the suppressed and correlated frequency bands to the body to be guided, which first frequency selector is connected with a converter and with one control stage each coordinated to said one control plane, which converter is controlled from an oscillator to shift the information carrying bands into the frequency range of the correlated frequency bands, which converter is connected for each frequency band with the above-mentioned control stages, which control stages are connected with the above-mentioned second frequency selector for feeding the suppressed or correlated frequency bands to said frequency selector, said above-mentioned stages forming the transmitter base, and a receiver station at the self-propelled body comprising an input and a frequency selector, which frequency selector is connected for each control plane with one converter each being coordinated to one frequency band correlator, which converters are controlled from an oscillator for producing the frequency shift of the information carrying bands into the frequency range of the reference frequency bands, each correlator being fed with the information carrying noise band and the reference noise band simultaneously, at the output of which correlator stages are connected filters, in order to determine the control signals from the frequency bands supplied by the above-mentioned frequency selector and from the reference bands, said control signals being given at the control center.

* * * * *